(12) United States Patent
Yamashita et al.

(10) Patent No.: US 6,424,911 B2
(45) Date of Patent: Jul. 23, 2002

(54) INTERSECTION DISPLAY METHOD, AND MAP DISPLAY UNIT AND RECORDING MEDIUM FOR REALIZING THE METHOD

(75) Inventors: Atsushi Yamashita, Osaka; Kiyomi Sakamoto, Ikoma; Hiroyuki Hamada, Yawata; Teruaki Ata, Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/774,561

(22) Filed: Feb. 1, 2001

(30) Foreign Application Priority Data

Feb. 2, 2000 (JP) ........................................ 2000-025480

(51) Int. Cl.[7] .............................................. G09B 29/00
(52) U.S. Cl. ..................... 701/208; 701/209; 340/988; 340/990; 340/995
(58) Field of Search ................................ 701/208, 202, 701/209, 211, 214, 210, 201, 200; 340/988, 990, 995

(56) References Cited

U.S. PATENT DOCUMENTS

| | | | | |
|---|---|---|---|---|
| 4,937,753 A | * | 6/1990 | Yamada | 701/209 |
| 5,729,109 A | | 3/1998 | Kaneko et al. | 318/587 |
| 5,787,382 A | | 7/1998 | Kurabayashi | 701/214 |
| 5,832,406 A | | 11/1998 | Iwami et al. | 701/202 |
| 5,982,301 A | * | 11/1999 | Ohta et al. | 340/995 |

FOREIGN PATENT DOCUMENTS

| | | |
|---|---|---|
| EP | 0 580 105 | 1/1994 |
| WO | 99/54848 | 10/1999 |

* cited by examiner

Primary Examiner—William A. Cuchlinski, Jr.
Assistant Examiner—Marthe Y. Marc-Coleman
(74) Attorney, Agent, or Firm—Wenderoth, Lind & Ponack, L.L.P.

(57) ABSTRACT

On receipt of route information, map data in an area near the route is read. One intersection existing on the route is extracted from the read map data, and intersection-connected links connected to the intersection are extracted. The road widths from the center line to the right and left sides are specified for the intersection-connected links based on attribute data such as the actual road width of the intersection-connected links. New lines are drawn for all the intersection-connected links by translating the line representing the intersection-connected link as the center line rightward and leftward by the specified road widths, to determine right and left side lines of the intersection-connected link. Based on the thus-generated width-imparted intersection-connected links, an intersection shape is generated. This processing is repeated for all the intersections concerned.

32 Claims, 12 Drawing Sheets

INTERSECTION DISPLAY METHOD, AND MAP DISPLAY UNIT AND RECORDING MEDIUM FOR REALIZING THE METHOD

BACKGROUND OF THE INVENTION

1. Field of the Invention

The present invention relates to an intersection display method, and a map display unit and a recording medium for realizing this method. More particularly, the present invention relates to a method for displaying an intersection shape employed in map display units represented by vehicle-mounted navigation systems and portable navigation systems, a map display unit employing this method, and a recording medium containing a computer program or data for executing this method.

2. Description of the Background Art

Initially, in map display units such as navigation systems, a road network map using nodes and links to represent intersections and roads respectively was generally displayed on a screen upon request of the user.

In such a road network map, roads (links) were not provided with their widths. Therefore, the user found difficulty in intuitively understanding a node on the map as an intersection. Moreover, this type of map failed to display detailed road information, such as the number of lanes and lane regulations, relating to actual intersections and junctions (hereinafter, these are collectively called "intersections").

In recent years, in order to overcome the above problems, there have been developed various navigation systems employing a method for displaying a map provided with road widths. That is, road links are displayed in the shape having widths corresponding to the actual road widths, so as to present a map including roads closer to the actual roads in shape. According to the conventional method for displaying a map provided with road widths, road shapes having widths corresponding to the actual road widths are generated based on road links, and placed overlapping each other. In this method, the overlap portion of all the width-imparted roads connected to one node is considered as an intersection for convenience.

As a conventional map capable of providing intersections for convenience, usable is a town map constructed of geometries of buildings and blocks. In such a town map, portions other than buildings and blocks can be recognized as roads. Therefore, by using a town map, an intersection can be displayed in a shape considerably close to the actual shape.

The conventional method for displaying a map provided with road widths described above has the following problems. This method simply considers the overlap portion of width-imparted road links as an intersection shape for convenience. That is, this method does not generate an actual intersection shape. Therefore, the intersection shape for convenience greatly differs from the actual intersection shape in many cases.

In addition, in the conventional method for displaying a map provided with road widths, since the actual intersection shape is not recognized, it is very difficult to specify the positions at which accessories in and around an intersection (crosswalks, stop lines, an island in the center of a rotary, and the like) are to be placed.

Moreover, in the conventional method for displaying a map provided with road widths, a problem arises when a driving path is to be displayed in an intersection along a route searched based on the road network. That is, since the actual intersection shape is not determined, a driving path can only be drawn as a path passing through the node (intersection) of the original road network. Therefore, a smooth driving path cannot be drawn for a right or left turn at the intersection.

The conventional method using a town map for recognizing an intersection shape has the following problem. It takes a huge amount of time to collect nationwide detailed town map data. In reality, therefore, town maps of only limited areas are collected. If nationwide town map data is successfully collected, the resultant data amount will be enormous. It is difficult to store such nationwide town map data in a map display unit having a small memory capacity, a map display unit that receives map data via communications, and the like.

SUMMARY OF THE INVENTION

Therefore, an object of the present invention is to provide an intersection display method for generating and displaying an intersection shape by use of a road network map having a degree of scale higher than a town map, and a map display unit and a recording medium for realizing this method.

The present invention has the following features to attain the object above.

A first aspect of the present invention is directed to an intersection display method for generating and displaying an intersection shape by use of map data including a road network. The method includes the steps of:

reading from the map data an intersection node representing an intersection and intersection-connected links representing roads connected to the intersection node, constituting the road network;

generating an intersection shape at the intersection node and width-imparted intersection-connected links, based on the intersection node and the intersection-connected links; and displaying the intersection shape together with other information for guidance notification.

As described above, in the first aspect, an intersection shape is generated with reference to a road network included in map data. This allows for display of an intersection shape closer to the actual shape. In addition, the amount of map data required can be smaller compared with the case of generating an intersection shape using a town map.

Preferably, the step of generating an intersection shape includes:

generating a width-imparted intersection-connected link by specifying a road width of each of the intersection-connected links based on information associated with the intersection-connected link, and drawing side lines representing edges of the road on the right and left sides of the intersection-connected link based on the specified road width; and sorting the positions of the intersection-connected links based on the bearings at which the intersection-connected links are connected to the intersection node.

Thereafter, the following technique may be adopted.

The technique includes: determining cross points each between inner side lines of every two adjacent width-imparted intersection-connected links, and determining lines extending orthogonal to the intersection-connected links at positions outside the cross points with respect to the intersection node; and determining cross points between the lines and the side lines, and connecting the cross points in the order of the sorted intersection-connected links to form a polygon as the intersection shape.

By the above technique, the width-imparted road links and the lines defining the intersection shape cross at right angles. Therefore, the vehicle stop position at the intersection is explicitly determined, and the resultant intersection shape is closer to the actual shape.

Alternatively, the technique may include: determining cross points each between inner side lines of every two adjacent width-imparted intersection-connected links, and connecting the cross points in the order of the sorted intersection-connected links to form a polygon; and determining new points by shifting the cross points as the vertexes of the polygon by a predetermined distance along the side lines crossing at the respective vertexes outward with respect to the intersection node, and connecting the new points in the order of the sorted intersection-connected links to form a new polygon as the intersection shape.

The overlap portion of the width-imparted road links itself is not used as the intersection shape, but is expanded by shifting the vertexes of the portion outward with respect to the intersection node, to increase the number of corners of the intersection shape. The resultant intersection shape is closer to the actual shape.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, as the intersection shape.

This allows for display of a circular intersection such as a rotary.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, determining cross points between the circle and the side lines, and connecting the cross points in the order of the sorted intersection-connected links to form a new polygon as the intersection shape.

A polygon inscribed in a circle is a convex polygon without fail. Therefore, this technique is useful in the case where display of a concave polygon is difficult.

Preferably, after the step of generating an intersection shape, the method further includes the steps of: processing the intersection-connected links, including reading information on accessories of the intersection-connected links from the map data, and generating shapes of the accessories and determining the positions of the accessories in the intersection-connected links with reference to the intersection shape; and processing the intersection, including reading information on accessories of the intersection node from the map data, and generating shapes of the accessories and determining the positions of the accessories in the intersection shape with reference to the intersection shape, wherein the step of processing the intersection-connected links includes deleting portions of the accessories extending along roads (such as center lines, lanes, side strips, and sidewalks) that overlap the intersection shape.

Thus, as for accessories among those belonging to the intersection-connected links that extend along the links, such as center lines, lanes, side strips, and sidewalls, portions of these accessories that overlap the generated intersection shape are deleted. This prevents these accessories from protruding into the area of the intersection, and thus the resultant intersection shape is closer to the actual shape.

When the map data includes information that two of the intersection-connected links connected to the intersection are major roads, the step of processing the intersection preferably includes connecting center lines and lanes belonging to the two major roads among the deleted center lines and lanes belonging to the intersection-connected links smoothly, to generate a center line and lanes in the intersection shape.

By the above processing, if there is information that two of the intersection-connected links are major roads, lanes and center lines belonging to the two major roads are connected smoothly even when lanes and center lines are deleted in the intersection as described above. The resultant intersection shape has a marking close to the actual marking for a major road.

Preferably, the step of generating an intersection shape relates to generation of an intersection shape on a route from a departure point to a destination or a stopover searched based on the map data, and the step includes:

generating a vehicle path along a predetermined position on the width-imparted intersection-connected links through which the route runs; and deleting a portion of the vehicle path that overlaps the intersection shape and then connecting remainders of the vehicle path in the areas other than the intersection shape separated by the deletion smoothly, to generate a vehicle path in the intersection shape.

Thus, when a route searched based on a road network and information on the departure point and the destination is to be displayed on the generated intersection shape, the following processing is performed. That is, as for a vehicle path extending along intersection-connected links through which the route runs, a portion of the vehicle path that overlaps the intersection shape is deleted, and then remainders of the vehicle path separated by the deletion are connected smoothly in the intersection. In this way, the vehicle path can be displayed in a form closer to the actual path.

Further, preferably, when the map data includes information on a stop line of the intersection-connected link, the step of displaying the generated intersection shape includes generating the distance from the position of a vehicle to the stop line as the distance from the position of the vehicle to a coming intersection, in the generation of notification information for guidance of the vehicle based on the map data, the intersection shape, and the route from a departure point to a destination or a stopover searched based on the map data.

By adopting the above processing, the distance from the position of the vehicle to the stop line, not to the intersection node as the center of the intersection, is used for notification of the distance between the vehicle and the coming intersection, such as "300 m to next intersections", for example. This makes it possible to provide guidance in a manner more agreeable to the driver.

A second aspect is directed to a map display unit for displaying a map for guidance. The unit includes:

a map data storage part for storing map data including a road network;

a route search part for searching a route from a departure point to a destination or a stopover based on the map data;

a vehicle position detection part for detecting the position of a vehicle mounting the unit on the map data;

an intersection shape generation part for reading an intersection node representing an intersection and intersection-connected links representing roads connected to the intersection node constituting the road network, and generating width-imparted intersection-connected links and an intersection shape at the intersection node based on the intersection node and the intersection-connected links;

a guidance part for generating notification information for guidance of the vehicle based on the map data, the intersection shape, and the route searched; and an output part for outputting the notification information via map display or any other medium.

Preferably, the intersection shape generation part performs the operation of:

generating a width-imparted intersection-connected link by specifying a road width of each of the intersection-connected links based on information associated with the intersection-connected link, and drawing side lines representing edges of a road on the right and left sides of the intersection-connected link based on the specified road width; and sorting the positions of the intersection-connected links based on the bearings at which the intersection-connected links are connected to the intersection node, Thereafter, the following technique may be adopted.

The technique includes: determining cross points each between inner side lines of every two adjacent width-imparted intersection-connected links, and determining lines extending orthogonal to the intersection-connected links at positions outside the cross points with respect to the intersection node; and determining cross points between the lines and the side lines, and connecting the cross points in the order of the sorted intersection-connected links to form a polygon as the intersection shape.

Alternatively, the technique may include: determining cross points each between inner side lines of every two adjacent width-imparted intersection-connected links, and connecting the cross points in the order of the sorted intersection-connected links to form a polygon; and determining new points by shifting the cross points as the vertexes of the polygon by a predetermined distance along the side lines crossing at the respective vertexes outward with respect to the intersection node, and connecting the new points in the order of the sorted intersection-connected links to form a new polygon as the intersection shape.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, as the intersection shape.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, determining cross points between the circle and the side lines, and connecting the cross points in the order of the sorted intersection-connected links to form a new polygon as the intersection shape.

Also, preferably, the intersection shape generation part further performs the operation of:

reading information on accessories of the intersection-connected links from the map data, and generating shapes of the accessories and determining the positions of the accessories in the intersection-connected links with reference to the intersection shape, after the generation of the intersection shape;

reading information on accessories of the intersection node from the map data, and generating shapes of the accessories and determining the positions of the accessories in the intersection shape with reference to the intersection shape, after the generation of the intersection shape; and deleting portions of the accessories extending along roads (such as center lines, lanes, side strips, and sidewalls) that overlap the intersection shape.

When the map data includes information that two of the intersection-connected links connected to the intersection are major roads, the intersection shape generation part preferably connects center lines and lanes belonging to the two major roads among the deleted center lines and lanes belonging to the intersection-connected links smoothly, to generate a center line and lanes in the intersection shape.

Preferably, the intersection shape generation part generates an intersection shape on a route from a departure point to a destination or a stopover searched based on the map data, and further performs the operation of:

generating a vehicle path along a predetermined position on the width-imparted intersection-connected links through which the route runs; and deleting a portion of the vehicle path that overlaps the intersection shape and then connecting remainders of the vehicle path in the areas other than the intersection shape separated by the deletion smoothly, to generate a vehicle path in the intersection shape.

Further, preferably, when the map data includes information on a stop line of the intersection-connected link, the guidance part generates the distance from the position of the vehicle to the stop line as the distance from the position of the vehicle to a coming intersection.

As described above, the second aspect is directed to a map display unit employing the intersection display method in the first aspect. With the above construction, even a map display unit (such as a navigation system) having a small memory capacity can display an intersection shape.

A third aspect is directed to a recording medium containing an intersection display method for generating and displaying an intersection shape by use of map data including a road network recorded as a computer-executable program. The program at least executes the steps of:

reading from the map data an intersection node representing an intersection and intersection-connected links representing roads connected to the intersection node, constituting the road network;

generating an intersection shape at the intersection node and width-imparted intersection-connected links, based on the intersection node and the intersection-connected links; and displaying the intersection shape together with other information for guidance notification.

Preferably, the step of generating an intersection shape includes the steps of:

generating a width-imparted intersection-connected link by specifying a road width of each of the intersection-connected links based on information associated with the intersection-connected link, and drawing side lines representing edges of the road on the right and left sides of the intersection-connected link based on the specified road width; and sorting the positions of the intersection-connected links based on the bearings at which the intersection-connected links are connected to the intersection node.

Thereafter, the following technique may be adopted.

The technique includes: determining cross points each between inner side lines of every two adjacent width-imparted intersection-connected links, and determining lines extending orthogonal to the intersection-connected links at positions outside the cross points with respect to the intersection node; and determining cross points between the lines and the side lines, and connecting the cross points in the order of the sorted intersection-connected links to form a polygon as the intersection shape.

Alternatively, the technique may include: determining cross points each between inner side lines of every two adjacent width-imparted intersection-connected links, and connecting the cross points in the order of the sorted intersection-connected links to form a polygon; and determining new points by shifting the cross points as the vertexes of the polygon by a predetermined distance along the side lines crossing at the respective vertexes outward with respect to the intersection node, and connecting the new points in the order of the sorted intersection-connected links to form a new polygon as the intersection shape.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, as the intersection shape.

Alternatively, the technique may include: determining cross points each between inner side lines of every two adjacent width-imparted intersection-connected links, and connecting the cross points in the order of the sorted intersection-connected links to form a polygon; and generating a predetermined circle including the polygon with the intersection node as a center, determining cross points between the circle and the side lines, and connecting the cross points in the order of the sorted intersection-connected links to form a new polygon as the intersection shape.

Also, preferably, after the step of generating an intersection shape, the program further executes the steps of: processing the intersection-connected links, including reading information on accessories of the intersection-connected links from the map data, and generating shapes of the accessories and determining the positions of the accessories in the intersection-connected links with reference to the intersection shape; and processing the intersection, including reading information on accessories of the intersection node from the map data, and generating shapes of the accessories and determining the positions of the accessories in the intersection shape with reference to the intersection shape, wherein the step of processing the intersection-connected links includes deleting portions of the accessories extending along roads (such as center lines, lanes, side strips, and sidewalls) that overlap the intersection shape.

When the map data includes information that two of the intersection-connected links connected to the intersection are major roads, the step of processing the intersection preferably includes connecting center lines and lanes belonging to the two major roads among the deleted center lines and lanes belonging to the intersection-connected links smoothly, to generate a center line and lanes in the intersection shape.

Preferably, the step of generating an intersection shape relates to generation of an intersection shape on a route from a departure point to a destination or a stopover searched based on the map data, and the step further includes the steps of:

generating a vehicle path along a predetermined position on the width-imparted intersection-connected links through which the route runs; and deleting a portion of the vehicle path that overlaps the intersection shape and then connecting remainders of the vehicle path in the areas other than the intersection shape separated by the deletion smoothly, to generate a vehicle path in the intersection shape.

Further, preferably, when the map data includes information on a stop line of the intersection-connected link, the step of displaying the generated intersection shape includes generating the distance from the position of a vehicle to the stop line as the distance from the position of the vehicle to a coming intersection, in the generation of notification information for guidance of the vehicle based on the map data, the intersection shape, and the route from a departure point to a destination or a stopover searched based on the map data.

As described above, the third aspect is directed to a recording medium containing a program for executing the intersection display method of the first aspect. This aims to provide the intersection display method of the first aspect to existing display units in the form of software.

A fourth aspect of the present invention is directed to a data recording medium containing recorded computer-readable data. The data includes:

data on an intersection node representing an intersection constituting a road network;

data on intersection-connected links representing roads connected to the intersection node constituting the road network; and data on an intersection shape corresponding to the intersection node, generated based on the intersection node and the intersection-connected links.

Preferably, the intersection shape is a polygon formed by:

generating a width-imparted intersection-connected link by specifying a road width of each of the intersection-connected links based on information associated with the intersection-connected link, and drawing side lines representing edges of the road on the right and left sides of the intersection-connected link based on the specified road width;

sorting the positions of the intersection-connected links based on the bearings at which the intersection-connected links are connected to the intersection node;

determining a cross point between inner side lines for every two adjacent width-imparted intersection-connected links, and determining lines extending orthogonal to the intersection-connected links at positions outside the cross points with respect to the intersection node; and determining cross points between the lines and the side lines, and connecting the cross points in the order of the sorted intersection-connected links.

Alternatively, preferably, the intersection shape is a polygon formed by:

generating a width-imparted intersection-connected link by specifying a road width of each of the intersection-connected links based on information associated with the intersection-connected link, and drawing side lines representing edges of the road on the right and left sides of the intersection-connected link based on the specified road width;

sorting the positions of the intersection-connected links based on the bearings at which the intersection-connected links are connected to the intersection node;

determining cross points each between inner side lines of every two adjacent width-imparted intersection-connected links, and connecting the cross points in the order of the sorted intersection-connected links to form a provisional polygon; and determining new points by shifting the cross points as the vertexes of the provisional polygon by a predetermined distance along the side lines crossing at the respective vertexes outward with respect to the intersection node, and connecting the new points in the order of the sorted intersection-connected links.

Alternatively, preferably, the intersection shape is a predetermined circle formed by:

generating a width-imparted intersection-connected link by specifying a road width of each of the intersection-connected links based on information associated with the intersection-connected link, and drawing side lines representing edges of the road on the right and left sides of the intersection-connected link based on the specified road width;

sorting the positions of the intersection-connected links based on the bearings at which the intersection-connected links are connected to the intersection node;

determining cross points each between inner side lines of every two adjacent width-imparted intersection-connected links, and connecting the cross points in the order of the sorted intersection-connected links to form a polygon; and generating the predetermined circle including the polygon with the intersection node as a center.

Alternatively, preferably, the intersection shape is a polygon formed by:

generating a width-imparted intersection-connected link by specifying a road width of each of the intersection-connected links based on information associated with the intersection-connected link, and drawing side lines representing edges of the road on the right and left sides of the intersection-connected link based on the specified road width;

sorting the positions of the intersection-connected links based on the bearings at which the intersection-connected links are connected to the intersection node;

determining cross points each between inner side lines of every two adjacent width-imparted intersection-connected links, and connecting the cross points in the order of the sorted intersection-connected links to form a provisional polygon; and generating a predetermined circle including the provisional polygon with the intersection node as a center, determining cross points between the circle and the side lines, and connecting the cross points in the order of the sorted intersection-connected links.

As described above, in the fourth aspect, intersection shapes are prepared in advance using a high-throughput apparatus such as a workstation and a computer. The prepared intersection shapes are recorded on a recording medium so as to be associated with respective inspection nodes in a small-capacity road network. Thus, using such a recording medium, display of intersection shapes can be realized even by a map display unit that is poor in operation throughput and finds difficulty in directly calculating intersection shapes from a road network map on a display, without heavily burdening an arithmetic part and a memory of the unit.

These and other objects, features, aspects and advantages of the present invention will become more apparent from the following detailed description of the present invention when taken in conjunction with the accompanying drawings.

DESCRIPTION OF THE PREFERRED EMBODIMENTS

Basic Concept of the Invention

Before describing embodiments of the invention in detail, the basic concept of the invention will be described for easy understanding of the invention.

The intersection display method of the invention aims to generate and display an intersection shape closer to the actual shape. To attain this aim, the intersection display method of the invention uses a road network included in map data as a basis, and automatically generates and displays the shape of an intersection existing in the road network.

Figure 1A:
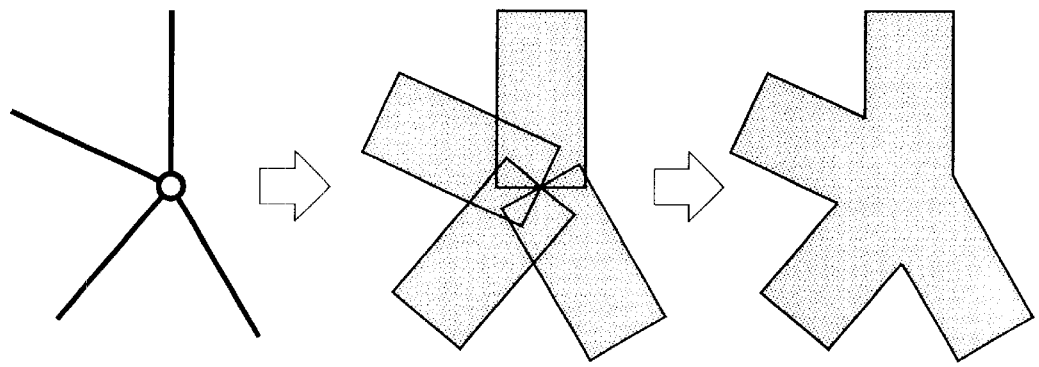
FIGS. 1a and 1b are illustrations that demonstrate the concept of the intersection display method to be realized by the invention.

As described above, in order to display roads in shapes closer to the actual shapes, some conventional technique generates and displays width-imparted roads by providing road links with widths corresponding to the actual road widths. In such a conventional technique, width-imparted roads corresponding to links connected to a node are placed to overlap each other at the node (intersection), and the overlap portion is simply considered as the intersection (FIG. 1a). In this case, therefore, the shape of the intersection is not always determined.

In the above conventional technique, therefore, it is difficult to perform processing that can only be performed on the premise that the intersection shape has been determined, such as correcting the intersection shape into a natural shape, placing intersection accessories in consideration of the intersection shape, and drawing a smooth driving path in the intersection.

Figure 1B:
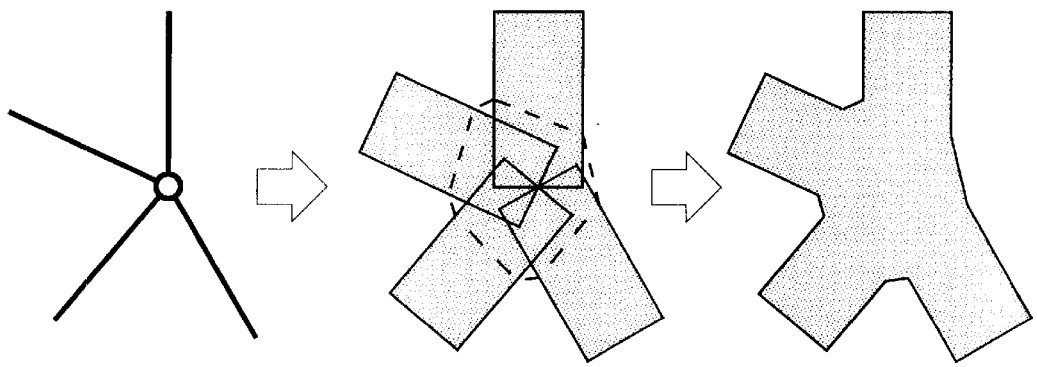

In view of the above, the intersection display method of the invention first determines width-imparted roads for respective links connected to an intersection, and then determines the intersection shape based on the shapes of the width-imparted roads (FIG. 1b).

In addition, the intersection display method of the invention determines the shapes and positions of intersection accessories such as an island in a rotary, a marking for right-turn vehicle guidance, crosswalks, stop lines, lanes, center lines, side strips, and sidewalls based on the determined intersection shape, so as to display the intersection in a more natural shape.

Moreover, according to the invention, the thus-generated intersection shapes are stored in a storage part in association with respective intersections in a road network. Thus, a road network map provided with intersection shapes is prepared as a new map form. By storing this road network map provided with intersection shapes, the above technique of the invention can also be employed by map display units having a throughput too small to directly generate intersection shapes by themselves. In addition, being smaller in capacity than a town map, the road network map provided with intersection shapes is advantageous in the case of being stored in map display units having a small memory capacity and in the case of map distribution via communications.

It should be noted that the above description of the basic concept of the invention is intended only for easy understanding of the invention and by no means allowed to be used to unduly narrow the scope of the invention.

Hereinafter, embodiments of the present invention will be described with reference to the relevant drawings.

First Embodiment

Figure 2:
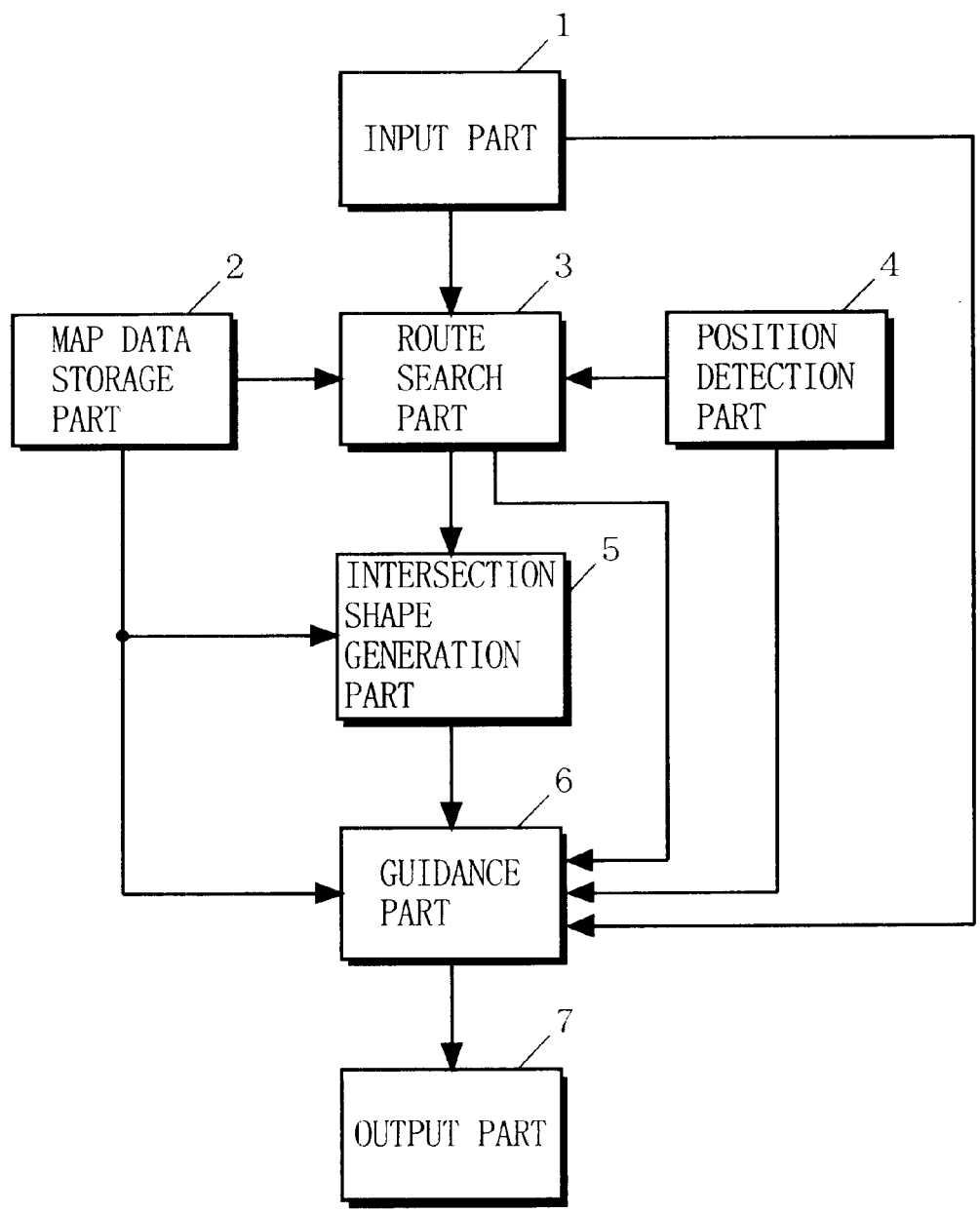
FIG. 2 is a block diagram of the construction of a map display unit employing an intersection display method of a first embodiment of the invention.

FIG. 2 is a block diagram of the construction of a map display unit employing an intersection display method of the first embodiment of the invention. Referring to FIG. 2, the map display unit of the first embodiment includes an input part 1, a map data storage part 2, a route search part 3, a position detection part 4, an intersection shape generation part 5, a guidance part 6, and an output part 7.

The intersection display method of the first embodiment is basically realized by the intersection shape generation part 5. For easy understanding, however, the entire map display unit employing the intersection display method will be first outlined. Note that the constructions of the input part 1, the map data storage part 2, the route search part 3, the position detection part 4, the guidance part 6, and the output part 7 are not restricted to those exemplified in the following description, but any of constructions used in known map display units may be adopted.

The input part 1 includes a remote controller, a touch sensor, a keyboard, a mouse, and the like operated by the user, for example, and is used to input instructions such as selection of functions of the map display unit (change of the item to be processed, switch of the map, change of the hierarchical level, and the like), setting of a departure point and a destination (including a stopover), and selection of a route search mode. Instruction information output from the input part 1 is supplied to the route search part 3 and the guidance part 6.

The map data storage part 2 includes an optical disk (CD, DVD, and the like), a hard disk, a large-capacity memory, and the like, for example, for storing information relating to a road network (map data) such as the connection status, coordinates, shapes, attributes, and regulations for respective intersections and roads. The map data stored in the map data storage part 2 is read and used as appropriate by the route research part 3, the intersection shape generation part 5, and the guidance part 6. The map data stored in the map data storage part 2 may be two-dimensional map data or three-dimensional map data.

The position detection part 4 includes a GPS, a radio beacon receiver, a vehicle speed sensor, various speed sensors, an absolute bearing sensor, and the like, for detecting the current position of a vehicle. Vehicle current position information outputted from the position detection part 4 is supplied to the route search part 3 and the guidance part 6.

The route search part 3 reads map data in a necessary range from the map data storage part 2 according to the instruction information received from the input part 1. The route search part 3 then determines the departure point and the destination based on the received instruction information such as location information, and searches for a minimum-cost route from the departure point to the destination in consideration of intersection traffic regulation and one-way traffic regulation if any.

To state a specific example, upon receipt of an instruction of executing the route search mode from the input part 1, the route search part 3 sets, as the departure point of the search, either the departure point inputted into the input part 1 or the vehicle current position detected by the position detection part 4, and sets as the destination of the search the destination inputted into the input part 1. The route search part 3 also reads map data in a range covering the area from the departure point to the destination from the map data storage part 2. Then, the route search part 3 searches for a guidance route (for example, a shortest-time route or a shortest-distance route) from the departure point to the destination on the read map data. As an algorithm for the route search executed by the route search part 3, known Dijkstra algorithm, for example, is used.

Upon completion of the route search, the route search part 3 outputs the resultant route information to the intersection shape generation part 5 and the guidance part 6.

The intersection shape generation part 5 executes a predetermined operation to be described later, based on the route information received from the route search part 3 and the map data (the same map data as that read by the route search part 3) received from the map data storage part 2, to generate information on the shape of an intersection existing on the route searched by the route search part 3.

The generated intersection shape information is held in the intersection shape generation part 5, which is used by being read by the guidance part 6 as appropriate.

The guidance part 6 generates guidance information including the intersection shape based on the route information received from the route search part 3, the vehicle current position information received from the position detection part 4, the map data received from the map data storage part 2, and the intersection shape information received from the intersection shape generation part 5.

To state a specific example, upon receipt of an instruction of executing a guidance notification mode from the input part 1, the guidance part 6 first generates guidance information for notifying the route to be driven by the user on the map based on the route information, the vehicle current position information, and the map data. As the vehicle current position approaches an intersection on the route, the guidance part 6 reads intersection shape information on the intersection in question among all the intersection shape information held in the intersection shape generation part 5, and generates guidance information for displaying the intersection shape. The generated guidance information is outputted to the output part 7.

The output part 7 includes a display device (a liquid crystal display, a CRT display, and the like) and displays an image for guidance notification on a screen, or outputs sound via a speaker or the like, based on the guidance information received from the guidance part 6.

Hereinafter, the intersection display method (intersection shape generation method) of the first embodiment of the invention will be described in a concrete manner with reference to FIGS. 3 to 12.

Figure 3:
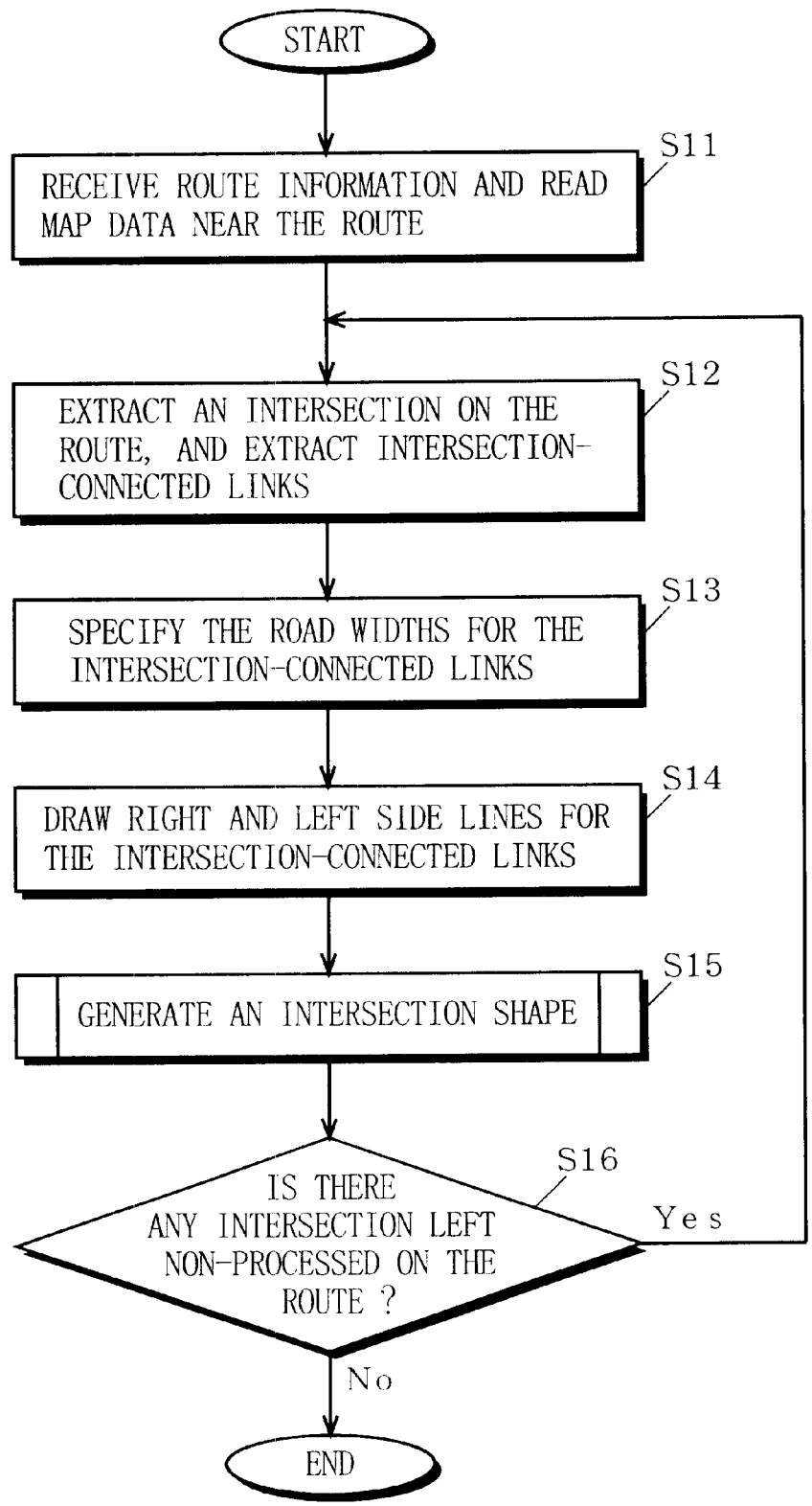
FIG. 3 is a flowchart showing an example of the operation of an intersection shape generation part 5 in FIG. 2.
Figure 4:
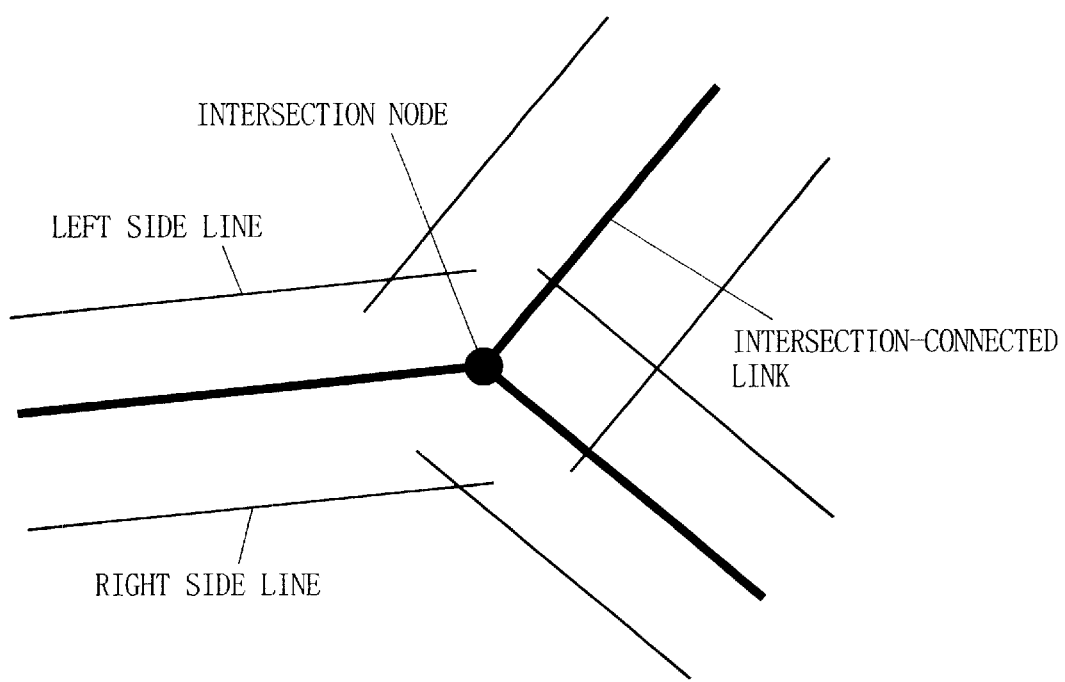
FIG. 4 is an illustration demonstrating an example of generation of width-imparted intersection-connected links at an intersection according to steps S11 to S14 in FIG. 3.

FIG. 3 is a flowchart showing an example of the operation executed by the intersection shape generation part 5 of FIG. 2. FIG. 4 is an illustration that demonstrates an example of generation of width-imparted intersection-connected links at an intersection according to steps S11 to S14 in FIG. 3. FIGS. 5, 7, 9, and 11 are flowcharts showing in more detail examples of the operation of sub-routine step S15 (intersection shape generation) in FIG. 3. FIGS. 6, 8, 10, and 12 are illustrations that demonstrate examples of generation of intersection shapes according to the steps in FIGS. 5, 7, 9, and 11, respectively.

First, referring to FIGS. 3 and 4, the intersection shape generation part 5 receives the route information from the route search part 3 and reads map data in the area near the route from the map data storage part 2 (step S11). The intersection shape generation part 5 extracts one intersection (intersection node) existing on the route from the read map data, and further extracts road links connected to the extracted intersection (hereinafter, these road links are referred to as intersection-connected links) (step S12). Next, the intersection shape generation part 5 reads attribute data of the extracted intersection-connected links, such as the actual road width, the numbers of up lanes and down lanes, and the road type, from the map data storage part 2, to specify the road widths from the center line to the left side and the right side of each intersection-connected link (step S13). In the case where no attribute data such as the actual road width of an intersection-connected link is stored in the map data storage part 2, the road width may be determined using a predetermined default value. The intersection shape generation part 5 then draws new lines with respect to every intersection-connected link to be connected to the intersection by translating the line representing each intersection-connected link as a center line rightward and leftward by the specified road widths, to determine right and left side lines of the intersection-connected link (step S14).

By the above processing, width-imparted intersection-connected links provided with road widths corresponding to the actual road widths are generated for the respective intersection-connected links (FIG. 4).

Next, the intersection shape generation part 5 generates an intersection shape based on the generated width-imparted intersection-connected links (step S15).

Various techniques may be employed to generate an intersection shape. Hereinafter, four exemplary techniques among those will be described.

Figure 5:
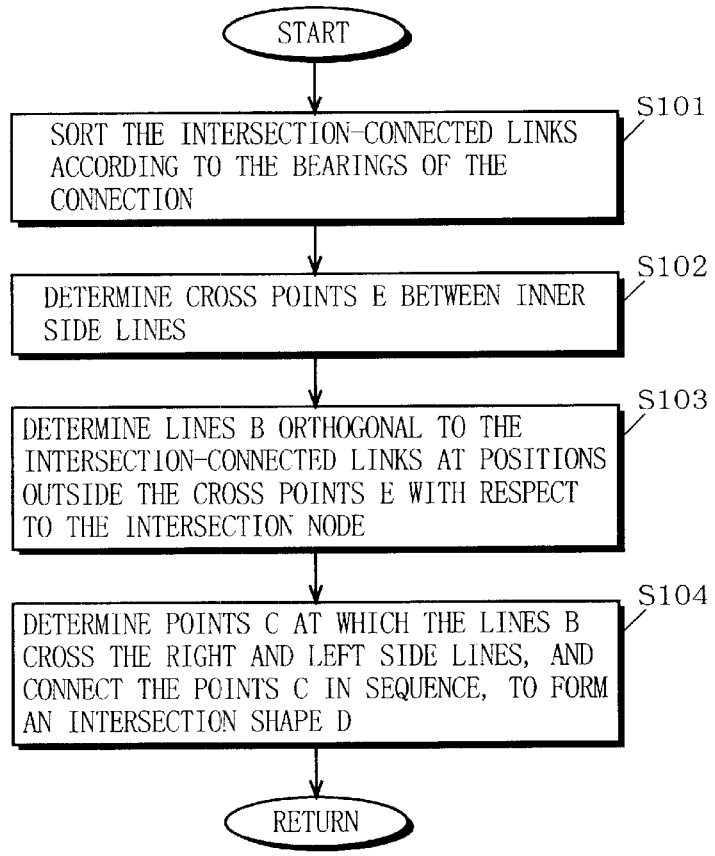
FIG. 5 is a flowchart showing in more detail an example of the operation in sub-routine step S15 (generation of intersection shape) in FIG. 3.
Figure 6:
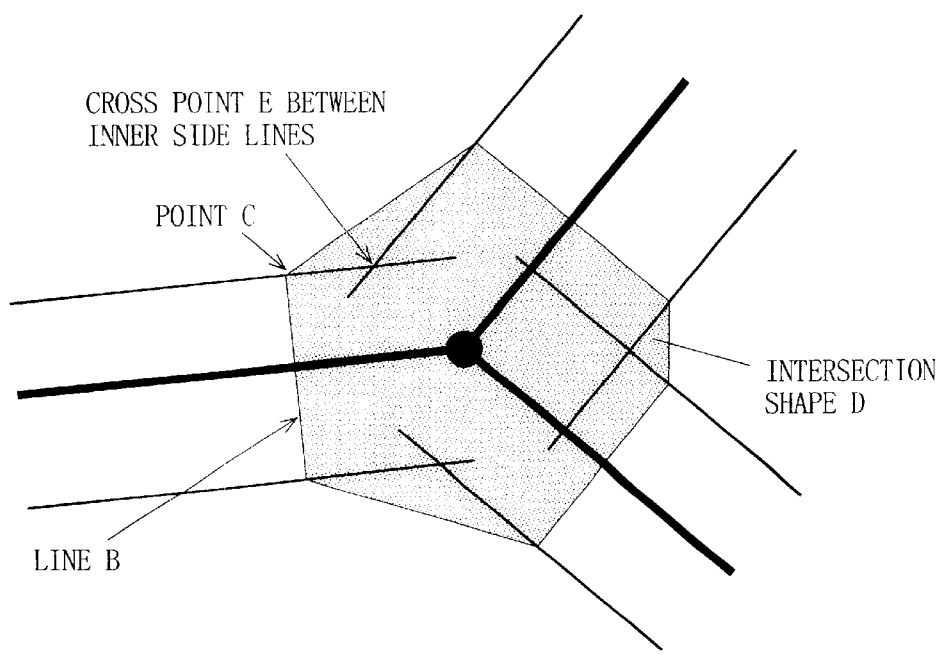
FIG. 6 is an illustration demonstrating an example of generation of an intersection shape according to the steps in FIG. 5.

The first technique will be described with reference to FIGS. 5 and 6.

The intersection shape generation part 5 sorts a group of intersection-connected links connected to an intersection according to the bearings at which the links are connected to the intersection (for example, so that the links are arranged clockwise starting from the true north) (step S101). Thereafter, the intersection shape generation part 5 determines a cross point E between the inner side lines of every pair of adjacent intersection-connected links (step S102). The cross point of the inner side lines refers to a point of intersection between the right side line of the left-hand intersection-connected line and the left side line of the right-hand intersection-connected link. The intersection shape generation part 5 then determines lines B extending orthogonal to the intersection-connected links at positions outside the cross points E with respect to the intersection node (step S103). The positions may be determined arbitrarily in consideration of the display size of the intersection and the like. Thereafter, the intersection shape generation part 5 determines points C at which the lines B cross the right and left side lines, and connects the points C in the order of the sorted intersection-connected links, to form a polygon as an intersection shape D (step S104).

Figure 7:
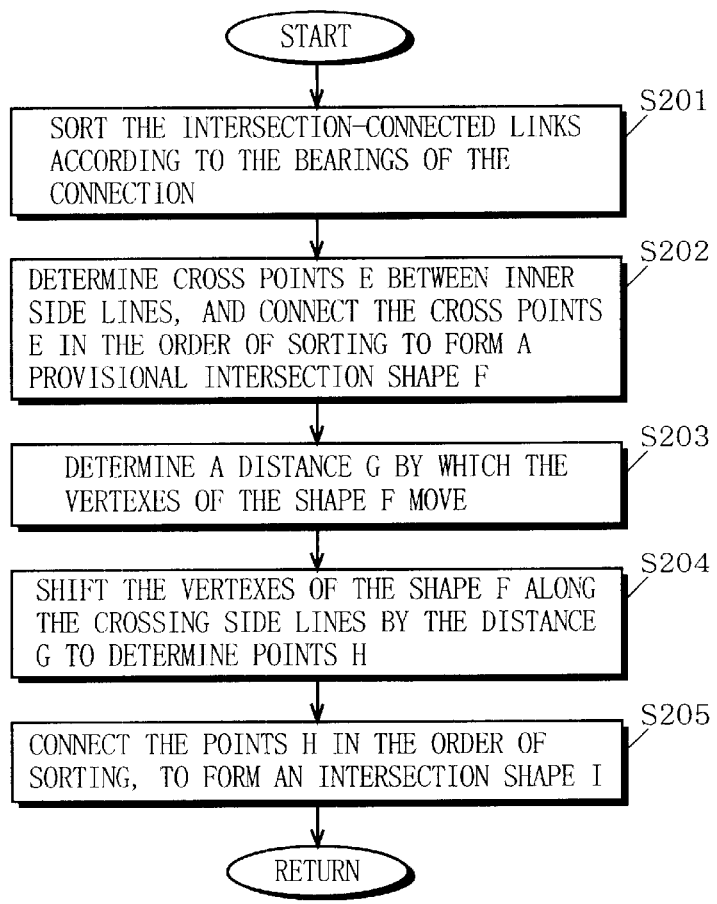
FIG. 7 is a flowchart showing in more detail another example of the operation in sub-routine step S15 (generation of intersection shape) in FIG. 3.
Figure 8:
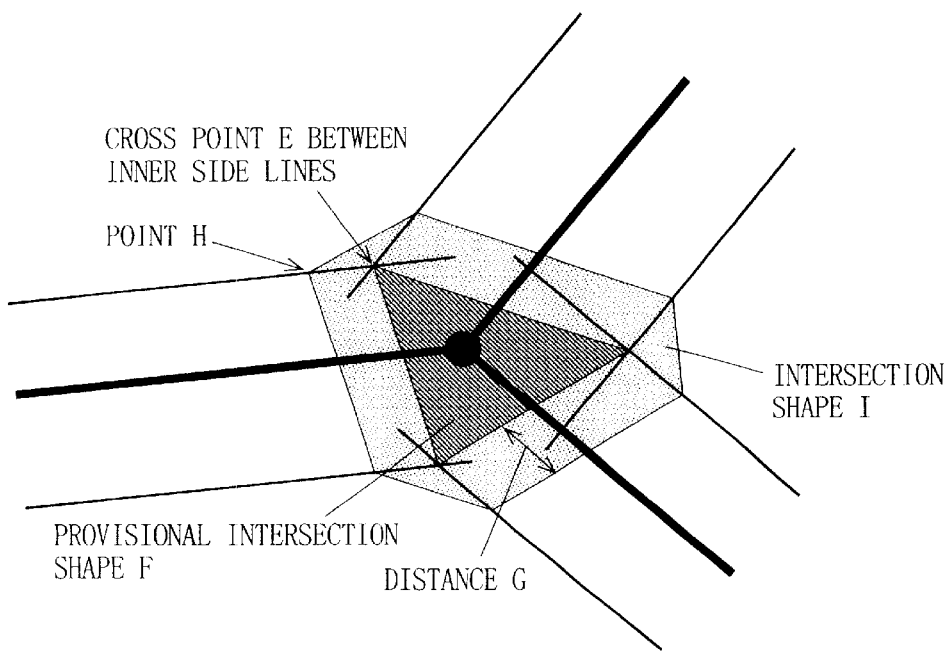
FIG. 8 is an illustration demonstrating an example of generation of an intersection shape according to the steps in FIG. 7.

The second technique will be described with reference to FIGS. 7 and 8.

As in step S101 described above, the intersection shape generation part 5 sorts a group of intersection-connected links connected to an intersection according to the bearings at which the links are connected to the intersection (step S201). The intersection shape generation part 5 then determines a cross point E between the inner side lines of every pair of adjacent intersection-connected links, and connects the cross points E in the order of the sorted intersection-connected links, to form a polygon as a provisional intersection shape F (step S202). The cross point between the inner side lines is defined as described above. Thereafter, the intersection shape generation part 5 determines a distance G by which the vertexes of the provisional intersection shape F (that is, the cross points E between the inner side lines) are shifted (step S203). The distance G may be determined arbitrarily in consideration of the display size of the intersection and the like. The intersection shape generation part 5 then determines points H by shifting, outward with respect to the intersection node, each vertex of the provisional intersection shape F by the distance G along the two side lines crossing at the vertex (step S204). Subsequently, the intersection shape generation part 5 connects the resultant points H in the order of the sorted intersection-connected links, to form a polygon as a final intersection shape I (step S205).

Figure 9:
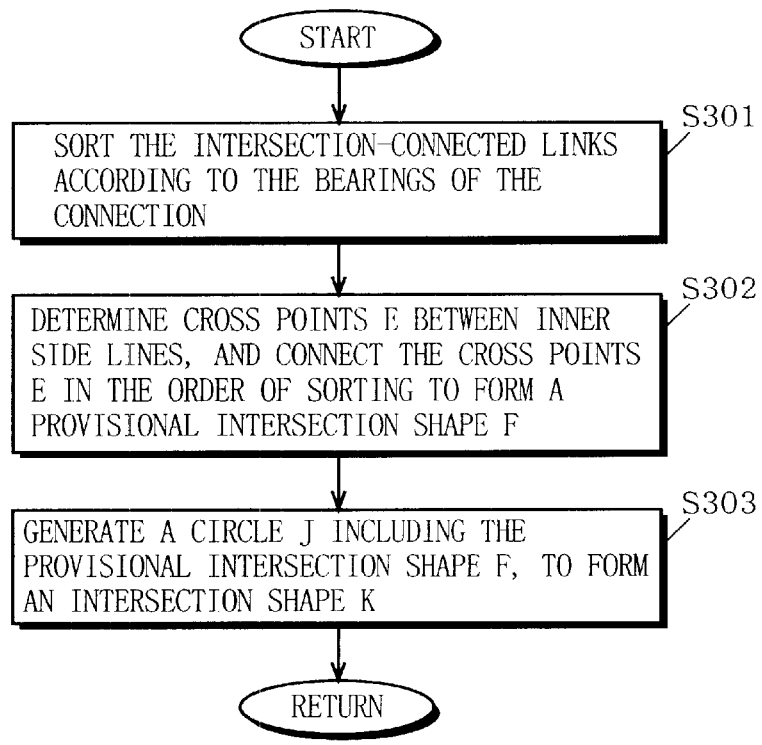
FIG. 9 is a flowchart showing in more detail yet another example of the operation in sub-routine step S15 (generation of intersection shape) in FIG. 3.
Figure 10:
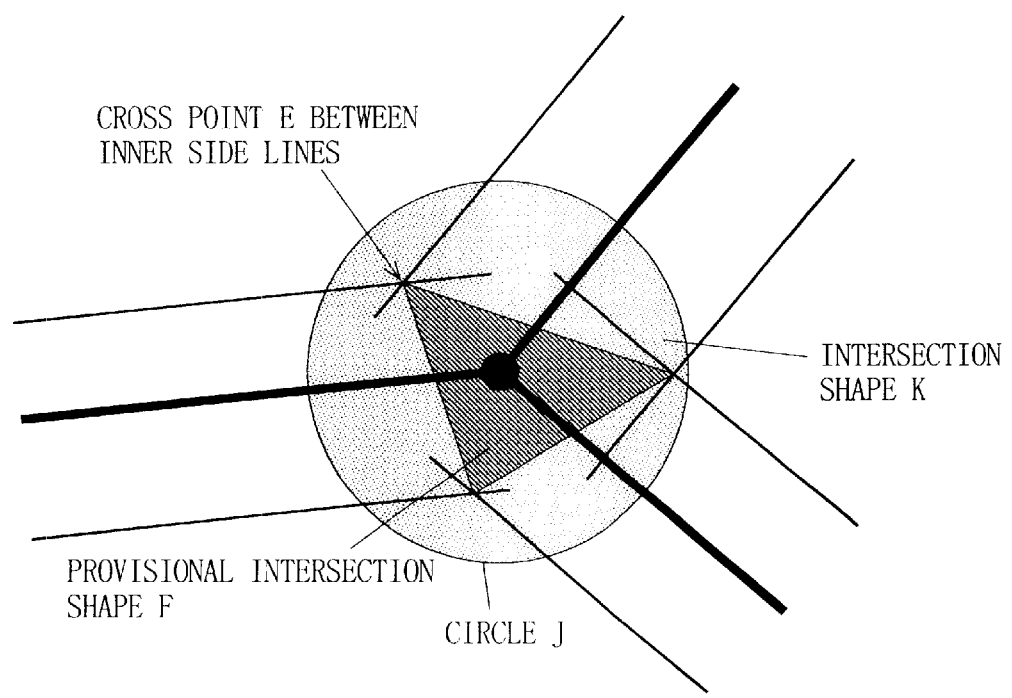
FIG. 10 is an illustration demonstrating an example of generation of an intersection shape according to the steps in FIG. 9.

The third technique will be described with reference to FIGS. 9 and 10.

As in step S101 described above, the intersection shape generation part 5 sorts a group of intersection-connected links connected to an intersection according to the bearings at which the links are connected to the intersection (step S301). Thereafter, as in step S202 described above, the intersection shape generation part 5 determines a cross point E between the inner side lines of every pair of adjacent intersection-connected links, and connects the cross points E in the order of the sorted intersection-connected links, to form a polygon as a provisional intersection shape F (step S302). The cross point between the inner side lines is defined as described above. The intersection shape generation part 5 then forms a circle J that includes the provisional intersection shape F, as a final intersection shape K (step S303). The center of the circle J may be determined arbitrarily as long as the circle includes the provisional intersection shape F. For example, when the center of the circle J is equal to the intersection node, the radius of the circle J is equal to or more than the maximum of the distances between the intersection node and the vertexes of the provisional intersection shape F.

The third technique is useful when the interaction is a rotary, i.e., a traffic circle, or when the intersection shape is displayed in an abstract form.

Figure 11:
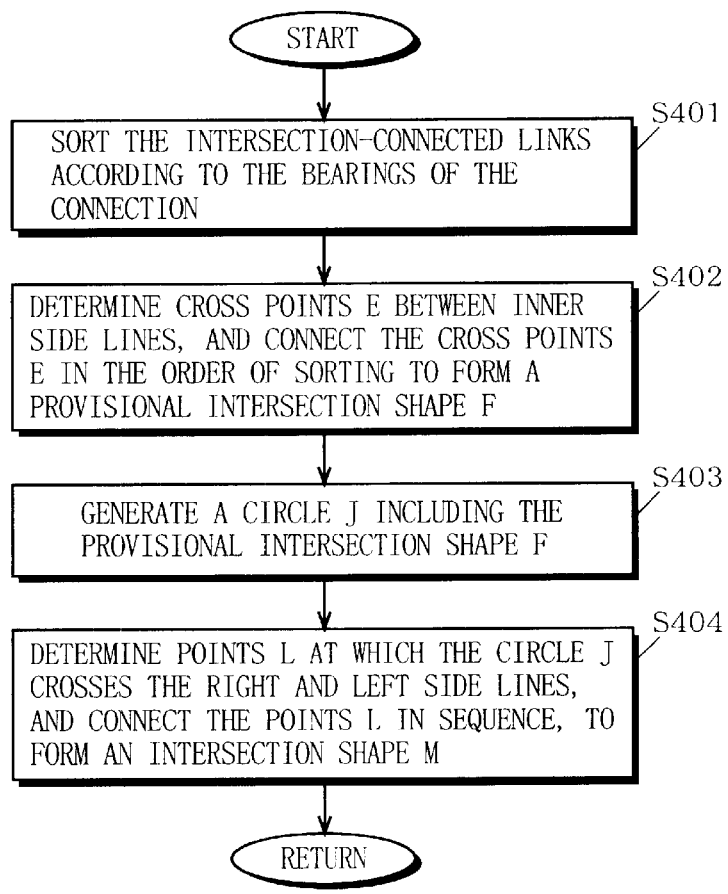
FIG. 11 is a flowchart showing in more detail yet another example of the operation in sub-routine step S15 (generation of intersection shape) in FIG. 3.
Figure 12:
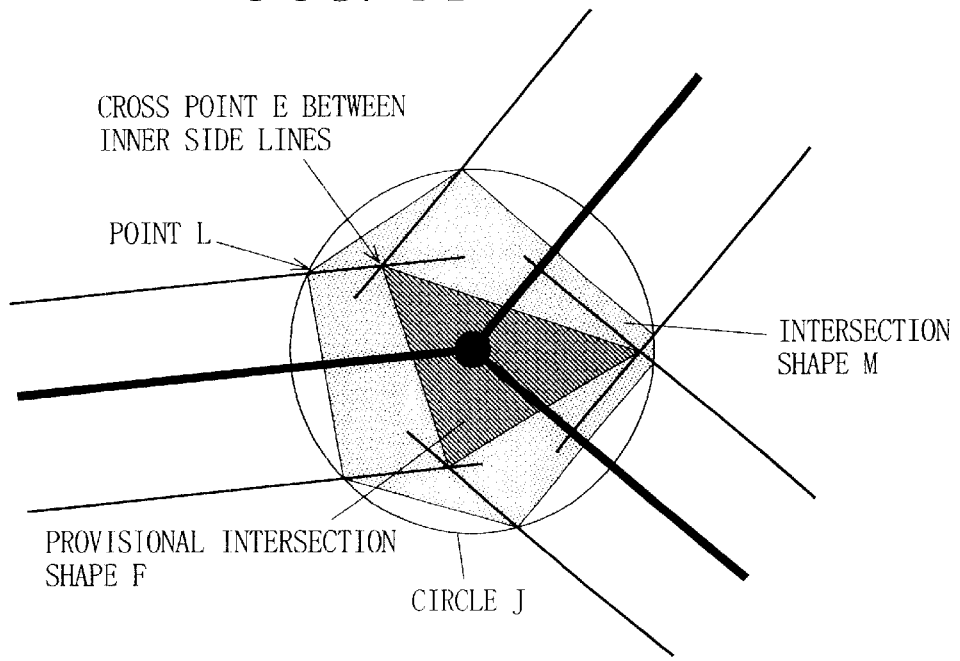
FIG. 12 is an illustration demonstrating an example of generation of an intersection shape according to the steps in FIG. 11.

The fourth technique will be described with reference to FIGS. 11 and 12.

As in step S101 described above, the intersection shape generation part 5 sorts a group of intersection-connected links connected to an intersection according to the bearings at which the links are connected to the intersection (step S401). Thereafter, as in step S202 described above, the intersection shape generation part 5 determines a cross point E between the inner side lines of every pair of adjacent intersection-connected links, and connects the cross points E in the order of the sorted intersection-connected links, to form a polygon as a provisional intersection shape F (step S402). The cross point of the inner side lines is defamed as described above. The intersection shape generation part 5 then forms a circle J that includes the provisional intersection shape F (step S403). The center of the circle J may be determined arbitrarily as long as the circle includes the provisional intersection shape F, as described above. Thereafter, the intersection shape generation part 5 determines points L are connected in the order of the sorted intersection-connected links, to form a polygon as an intersection shape M (step S404).

A polygon inscribed in the circle J is a convex polygon without fail. Therefore, the fourth technique is useful in the case where the output part 7 finds difficulty in displaying a concave polygon.

Referring back to FIG. 3, once generation of the shape of one intersection is completed in step S15, the intersection shape generation part 5 examines whether or not there remains an intersection on the route that has not been subjected to the intersection shape generation processing (step S16). If it is determined in step S16 that there remains an intersection that has not been subjected to the process, the operation returns to step S12 to repeat the process described above for this intersection. If it is determined that there remains no intersection, the intersection shape generation process is terminated.

Thus, according to the intersection display method of the first embodiment of the invention, the shape of an intersection is generated based on road network information included in existing map data.

Thus, in road map display, an intersection shape closer to the actual shape can be displayed. In addition, the capacity required for map data can be smaller compared with the case of generating an intersection shape using a town map.

Second Embodiment

In the first embodiment above, described was a basic method for generating an intersection shape based on road network information included in existing map data and displaying the resultant intersection.

In a second embodiment, an intersection display method with improved user convenience is provided by storing specific information in advance in the map data storage part and utilizing the specific information as well as the intersection shape generated by any of the above techniques.

Figure 13:
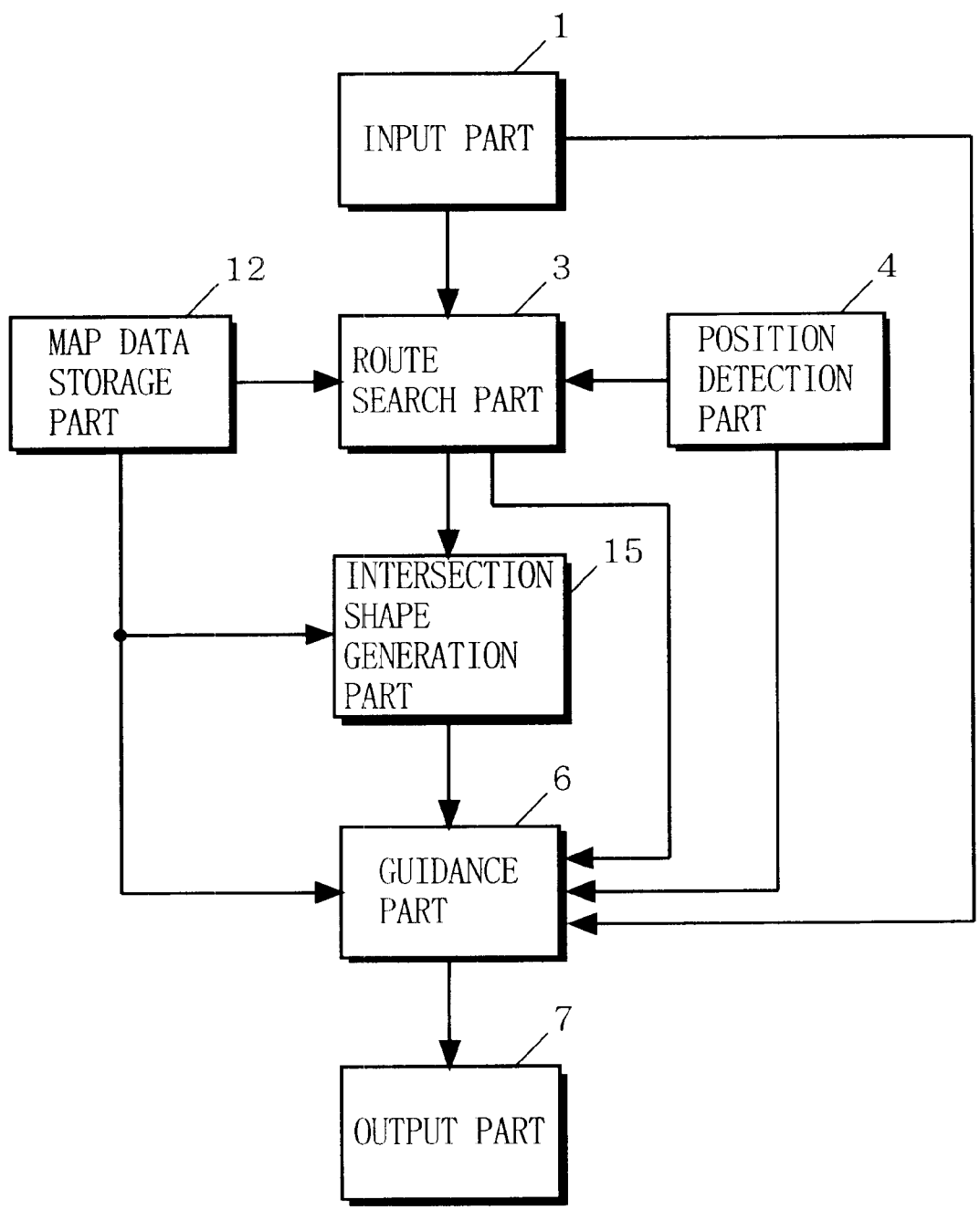
FIG. 13 is a block diagram of the construction of a map display unit employing an intersection display method of a second embodiment of the invention.

FIG. 13 is a block diagram of the construction of a map display unit employing an intersection display method of the second embodiment of the invention. Referring to FIG. 13, the map display unit of the second embodiment includes the input part 1, a map data storage part 12, the route search part 3, the position detection part 4, an intersection shape generation part 15, the guidance part 6, and the output part 7.

As is apparent from FIG. 13, the map display unit of the second embodiment includes the map data storage part 12 and the intersection shape generation part 15 in place of the map data storage part 2 and the intersection shape generation part 5 in the first embodiment, respectively. The other components of the map display unit of the second embodiment are the same as those of the map display unit of the first embodiment. The same components are denoted by the same reference numerals, and the description thereof is omitted here.

Basically, the intersection display method of the second embodiment of the invention is realized by the map data storage part 12 and the intersection shape generation part 15.

In the map data storage part 12, stored in advance is specific information such as whether or not a center line, a sidewalk/shoulder, and a crosswalk respectively exist, and the number of lanes for each road link, and whether or not a rotary, a marking for right-turn vehicle guidance, and a major road respectively exist for each intersection node, in addition to the map data described above.

The intersection shape generation part 15 first executes the predetermined operations described in the first embodiment based on the route information received from the route search part 3 and the map data (the same map data as that read by the route search part 3) received from the map data storage part 12, to generate information on the shape of an intersection existing on the route searched by the route search part 3. The intersection shape generation part 15 then reads the specific information on the intersection in question from the map data storage part 12, to determine the positions and shapes of intersection-connected link accessories and the positions and shapes of the intersection accessories, and adds the results to the intersection shape information.

The thus-generated intersection shape information is held in the intersection shape generation part 15, which is used by being read by the guidance part 6 as appropriate.

Hereinafter, the intersection display method (intersection shape generation method) of the second embodiment of the invention will be described in a concrete manner with reference to FIGS. 14 to 16.

Figure 14:
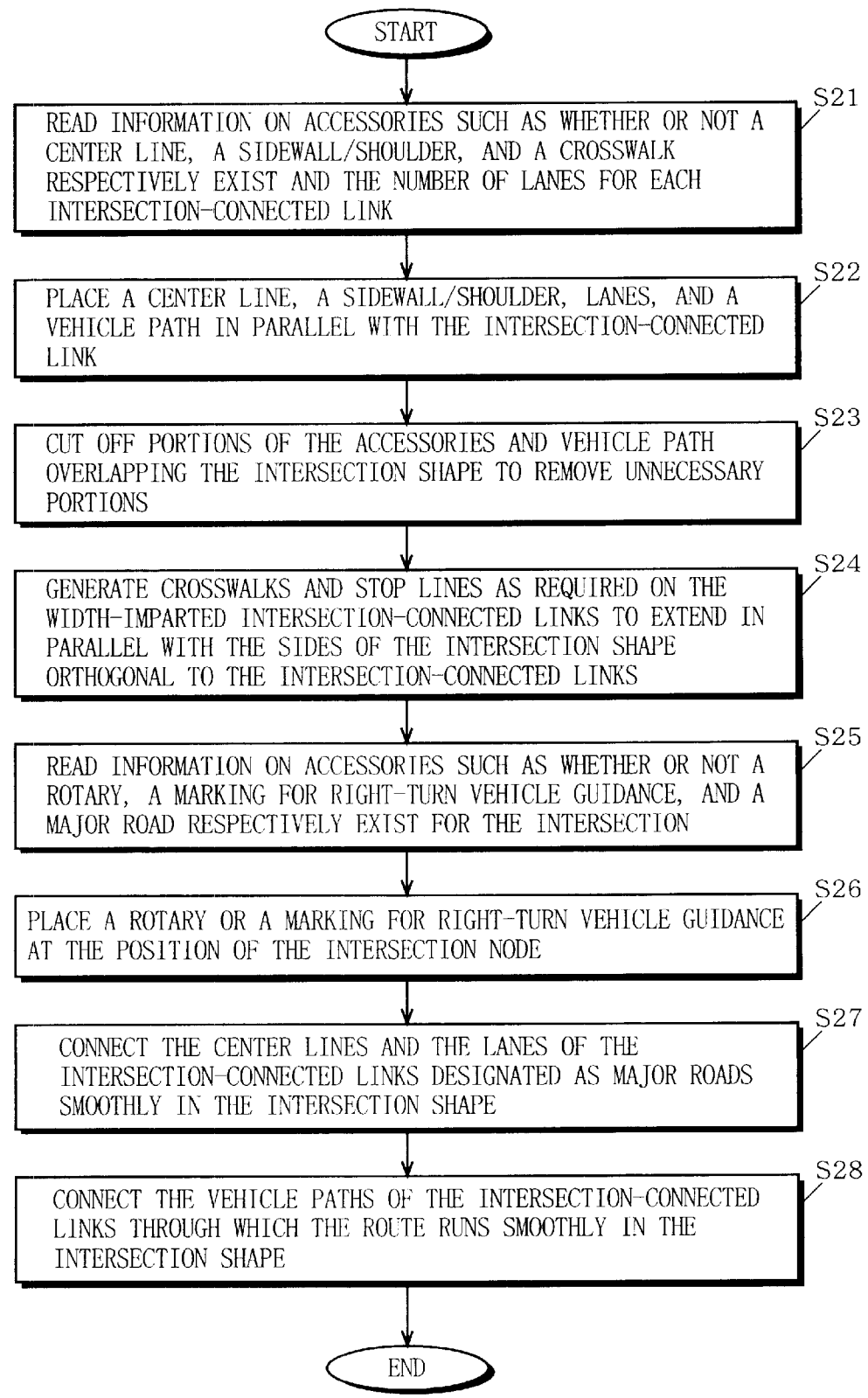
FIG. 14 is a flowchart showing an example of the operation of an intersection shape generation part 15 in FIG. 13 performed in addition to the operation of the intersection shape generation part 5 in FIG. 2.

FIG. 14 is a flowchart showing an example of the operation additionally executed by the intersection shape generation part 15 shown in FIG. 13, which also executes the operation described above as being executed by the intersection shape generation part 5 shown in FIG. 2. The steps in FIG. 14 are preferably executed between steps S15 and S16 in FIG. 3. FIG. 15 is an illustration that demonstrates an example of generation of an intersection shape provided with intersection-connected link accessories according to steps S21 to S24 in FIG. 14. FIG. 16 is an illustration that demonstrates an example of generation of an intersection shape provided with intersection accessories according to steps S25 to S28 in FIG. 14.

Figure 15:
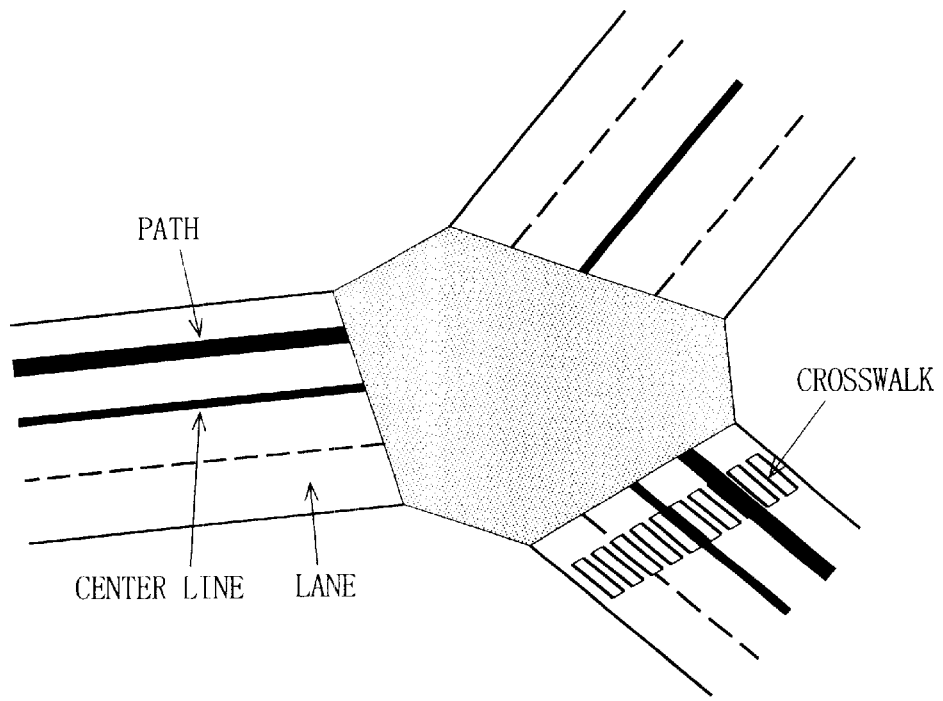
FIG. 15 is an illustration demonstrating an example of generation of an intersection shape provided with intersection-connected link accessories according to steps S21 to S24 in FIG. 14.

First, referring to FIGS. 14 and 15, the intersection shape generation part 15 reads information such as whether or not a center line, a sidewall/shoulder, and a crosswalk respectively exist and the number of lanes for each intersection-connected link from the map data storage part 12 (step S21). The intersection shape generation part 15 then places a center line when it exists, a sidewall or a shoulder when it exists, and lanes corresponding to the number of lanes, so that these extend in parallel with the intersection-connected link (step S22). The intersection shape generation part 15 also places a vehicle path so as to run along the center of the lane when the route supplied from the route search part 3 passes through the intersection-connection link in question (step S22). By this placement, the accessories and the vehicle path are also formed in the area of the intersection shape. Therefore, the intersection shape generation part 15 cuts off portions of the accessories and vehicle path overlapping the intersection shape to remove unnecessary portions (step S23). Thus, center lines, sidewalls/shoulders, lanes, and vehicle paths are generated in the areas outside the intersection shape. The intersection shape generation part 15 further generates crosswalks and stop lines as required at locations on the width-imparted intersection-connected links to extend in parallel with the sides of the intersection shape orthogonal to the intersection-connected links (step S24).

Figure 16:
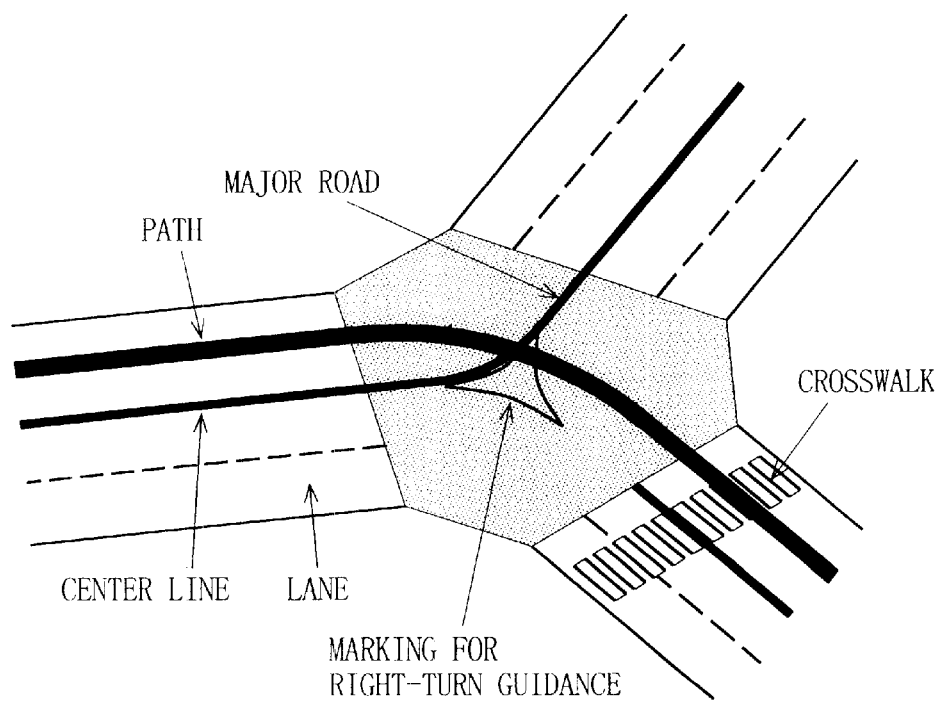
FIG. 16 is an illustration demonstrating an example of generation of an intersection shape provided with intersection accessories according to steps S25 to S28 in FIG. 14.

Next, referring to FIGS. 14 and 16, the intersection shape generation part 15 reads information such as whether or not a rotary, a marking for right-turn vehicle guidance, and a major road respectively exist in the intersection from the map data storage part 12 (step S25). The intersection shape generation part 15 then places a rotary when it exists and a marking for right-turn vehicle guidance when it exists, at the position of the intersection node (step S26). When a major road exists, the intersection shape generation part 15 reads two intersection-connected links designated as a major road from the map data storage part 12, and connects the center lines and the lanes of the two intersection-connected links smoothly to display a center line and lanes of the major road in the intersection shape (step S27). For connection of the separate two lines smoothly, a known method such as spline interpolation and a method using Bézier curve may be used. The intersection shape generation part 15 then selects two intersection-connected links through which the route runs based on the route information received from the route search part 3, and connects the vehicle paths of the two intersection-connected links smoothly, to display a vehicle path in the intersection shape (step S28).

The guidance part 6 generates guidance information on the intersection based on the thus-generated intersection shape information, and presents the resultant information to the user via the output part 7.

More specifically, once the vehicle current position enters a range of a predetermined distance from a next intersection, the guidance part 6 obtains the intersection shape information on the next intersection from the intersection shape generation part 15. The guidance part 6 then outputs the shape of the next intersection that will be soon passed through by the vehicle, as well as the vehicle path, to the output part 7.

Figure 17:
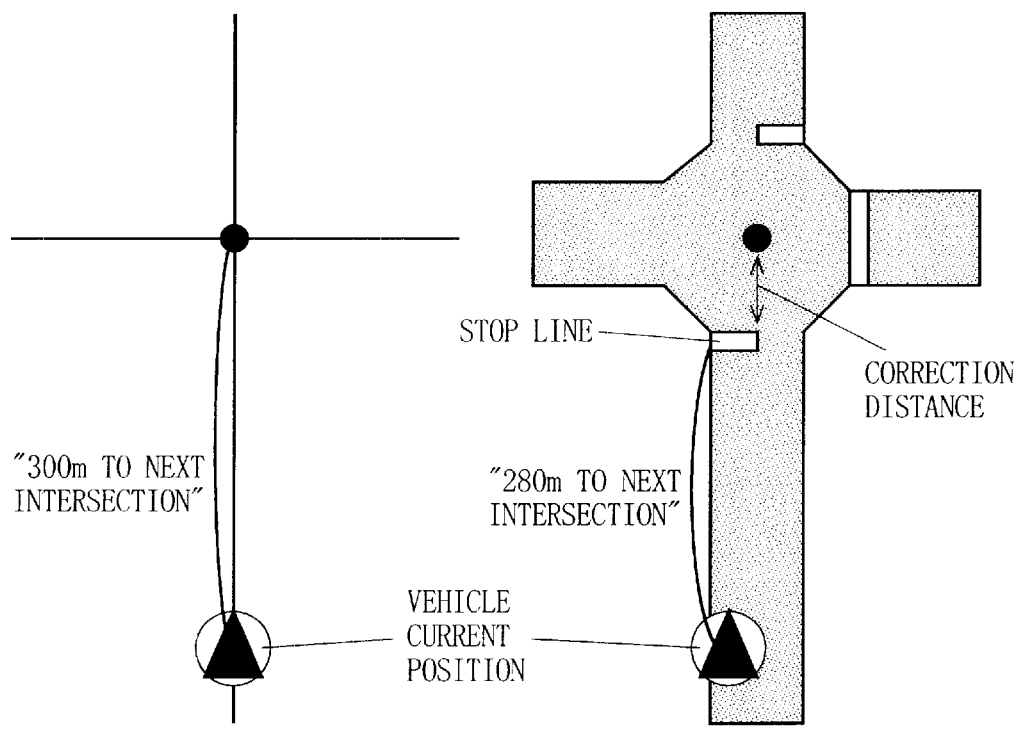
FIG. 17 is an illustration demonstrating a concept in notification of the distance from the current position to a coming intersection.

It is probably more agreeable to the driver to be notified of the distance from a coming intersection by the distance between the vehicle current position and the stop line placed before the intersection than by the distance between the vehicle current position and the intersection node (center of the intersection) (FIG. 17). Therefore, the guidance part 6 can determine the distance from the intersection in the following manner.

Figure 18:
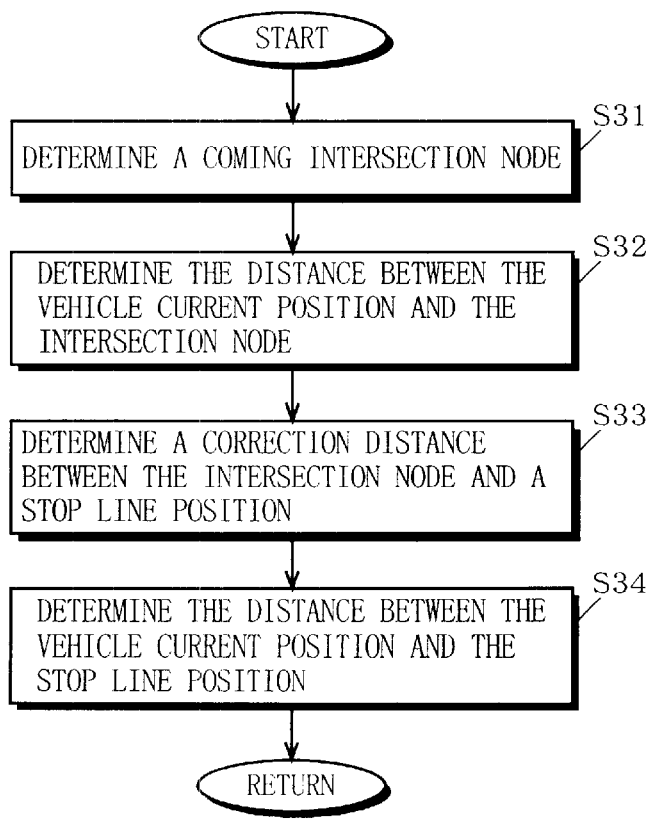
FIG. 18 is a flowchart showing the operation of calculating the distance from the current position to a coming intersection executed by a guidance part 6 in FIG. 13.

Referring to FIG. 18, the guidance part 6 first determines a coming intersection node (step S31). The guidance part 6 then determines the distance between the vehicle current position and the determined intersection node (step S32). Subsequently, the guidance part 6 determines a correction distance between the intersection node and a stop line position (see FIG. 17) (step S33), and then determines the distance between the vehicle current position and the stop line position considering the correction distance (step S34).

As described above, in the intersection display method of the second embodiment of the invention, in addition to generation of the intersection shape based on the road network information in the map data, shapes of accessories of the intersection-connected links and the intersection are generated based on specific information on the road links and the intersection node.

Thus, in road map display, an intersection shape closer to the actual shape can be displayed. In addition, the capacity required for map data can be smaller compared with the case of generating an intersection shape using a town map. Moreover, it is possible to place accessories of an intersection such as an island of a rotary and a marking for right-turn vehicle guidance and accessories of each intersection-connected link such as a crosswalk and a stop line, in addition to the intersection shape. As a result, an intersection can be displayed in a shape further closer to the actual shape.

In the above embodiments, intersection shapes were generated by the intersection shape generation part 5 or 15 as occasion arose. However, for units poor in CPU performance or memory capacity that require considerably long time to generate an intersection shape, it is possible to prepare in advance intersection shapes for all intersections on the route using a high-speed workstation, personal computer, or the like and then store the prepared intersection shapes in association with the respective intersections in the road network map. In this case, the operation to be executed by the intersection shape generation part 5 or 15 shown in the flowchart of FIG. 3 will be executed by a high-speed computer, and the generated intersection shapes are stored in the map data storage part 2 or 12 together with the road network. In the actual operation of the map display unit, the stored intersection shape is read from the map data storage part 2 or 12, and, in the second embodiment, steps S21 to S28 in FIG. 14 are further executed. By this alternative method, also, the effect described above can be obtained.

The thus-produced road network map with intersection shapes is smaller in capacity than a town map with intersection shapes mainly obtained by actual measurement. This makes it possible to store a map covering an extensive area in a map display unit. Also, this provides an advantage when a map is distributed via communications or broadcasting.

In the above embodiments, the functions of the route search part 3, the intersection shape generation part 5 or 15, and the guidance part 6 may be realized by CPU software control. In this case, a recording medium containing a program for the software control must be mounted in the map display unit.

While the invention has been described in detail, the foregoing description is in all aspects illustrative and not restrictive. It is understood that numerous other modifications and variations can be devised without departing from the scope of the invention.

What is claimed is:

1. An intersection display method for generating and displaying an intersection shape by use of map data including a road network, the method being for use in a map display unit for displaying a map for guidance, and the method comprising:

reading from the map data an intersection node representing an intersection and intersection-connected links representing roads connected to the intersection node, included in the road network;

generating width-imparted intersection-connected links for each intersection-connected link, respectively, by specifying a road width of each of the intersection-connected links, respectively, based on information associated with each of the intersection-connected links, respectively, and drawing side lines representing edges of the road on right and left sides of each of the intersection-connected links, respectively, based on the specified road width of each of the intersection-connected links, respectively;

sorting positions of the width-imparted intersection-connected links based on bearings at which the intersection-connected links are connected to the intersection node;

generating an intersection shape at the intersection node such that all cross points between the side lines of the sorted width-imparted intersection-connected links are contained within the generated intersection shape; and displaying the intersection shape together with other information for guidance notification.

2. The intersection display method according to claim 1, wherein said generating of an intersection shape comprises:

determining cross points each between inner ones of the side lines of every pair of adjacent width-imparted intersection-connected links, and determining lines extending orthogonal to the intersection-connected links at positions outside the cross points with respect to the intersection node; and determining cross points between the lines and the side lines, and connecting the cross points in an order of the sorted intersection-connected links to form a polygon as the intersection shape.

3. The intersection display method according to claim 1, wherein said generating of an intersection shape comprises:

determining cross points each between inner ones of the side lines of every pair of adjacent width-imparted intersection-connected links, and connecting the cross points in an order of the sorted intersection-connected links to form a polygon; and determining new points by shifting the cross points as the vertexes of the polygon by a predetermined distance along the side lines crossing at the respective vertexes outward with respect to the intersection node, and connecting the new points in the order of the sorted intersection-connected links to form a new polygon as the intersection shape.

4. The intersection display method according to claim 1, wherein said generating of an intersection shape comprises:

determining cross points each between inner ones of the side lines of every pair of adjacent width-imparted intersection-connected links, and connecting the cross points in an order of the sorted intersection-connected links to form a polygon; and generating a predetermined circle including the polygon within the circle with the intersection node as a center of the circle, as the intersection shape.

5. The intersection display method according to claim 1, wherein said generating of an intersection shape comprises:

determining cross points each between inner ones of the side lines of every pair of adjacent width-imparted intersection-connected links, and connecting the cross points in an order of the sorted intersection-connected links to form a polygon; and generating a predetermined circle including the polygon within the circle with the intersection node as a center of the circle, determining cross points between the circle and the side lines, and connecting the cross points in an order of the sorted intersection-connected links to form a new polygon as the intersection shape.

6. The intersection display method according to claim 1, further comprising, after said generating of an intersection shape:

processing the intersection-connected links, including reading information on accessories of the intersection-connected links from the map data, and generating shapes of the accessories and determining the positions of the accessories in the intersection-connected links with reference to the intersection shape; and processing the intersection, including reading information on accessories of the intersection node from the map data, and generating shapes of the accessories and determining the positions of the accessories in the intersection shape with reference to the intersection shape, wherein said processing of the intersection-connected links includes deleting portions of the accessories extending along roads that overlap the intersection shape.

7. The intersection display method according to claim 6, wherein, when the map data includes information that two of the intersection-connected links connected to the intersection are major roads, said processing of the intersection includes connecting center lines and lanes belonging to the two major roads smoothly, to generate a center line and lanes in the intersection shape.

8. The intersection display method according to claim 1, wherein said generating of an intersection shape relates to generation of an intersection shape on a route from a departure point to a destination or a stopover searched based on the map data, and said generating of an intersection shape further comprises:

generating a vehicle path along a predetermined position on the width-imparted intersection-connected links through which the route runs; and deleting a portion of the vehicle path that overlaps the intersection shape and connecting remainders of the vehicle path in the areas other than the intersection shape separated by the deletion smoothly, to generate a vehicle path in the intersection shape.

9. The intersection display method according to claim 1, wherein, when the map data includes information on a stop line of the intersection-connected link, said displaying of the intersection shape includes generating the distance from the position of a vehicle to the stop line as the distance from the position of the vehicle to a coming intersection, in the generation of notification information for guidance of the vehicle based on the map data, the intersection shape, and the route from a departure point to a destination or a stopover searched based on the map data.

10. A map display unit for displaying a map for guidance and for use with a vehicle, said map display unit, comprising:

a map data storage part for storing map data including a road network;

a route search part for searching a route from a departure point to a destination or a stopover based on the map data;

a vehicle position detection part for detecting a position of the vehicle on the map data;

an intersection shape generation part for reading an intersection node representing an intersection and intersection-connected links representing roads connected to the intersection node included in the road network, and generating an intersection shape at the intersection node based on the intersection node and the intersection-connected links;

a guidance part for generating notification information for guidance of the vehicle based on the map data, the intersection shape, and the route searched; and an output part for outputting the notification information via map display or any other medium, wherein said intersection shape generation part performs the operation of:

generating width-imparted intersection-connected links for each intersection-connected link, respectively, by specifying a road width of each of the intersection-connected links, respectively, based on information associated with each of the intersection-connected links, respectively, and drawing side lines representing edges of a road on right and left sides of each of the intersection-connected links, respectively, based on the specified road width of each of the intersection-connected links, respectively;

sorting positions of the width-imparted intersection-connected links based on bearings at which the intersection-connected links are connected to the intersection node; and generating the intersection shape at the intersection node such that all cross points between the side lines of the sorted width-imparted intersection-connected links are contained within the generated intersection shape.

11. The map display unit according to claim 10, wherein said intersection shape generation part performs the operation of:

determining cross points between inner ones of the side lines for every pair of adjacent width-imparted intersection-connected links, and determining lines extending orthogonal to the intersection-connected links at positions outside the cross points with respect to the intersection node; and determining cross points between the lines and the side lines, and connecting the cross points in the order of the sorted intersection-connected links to form a polygon as the intersection shape.

12. The map display unit according to claim 10, wherein said intersection shape generation part performs the operation of:

determining cross points each between inner ones of the side lines of every pair of adjacent width-imparted intersection-connected links, and connecting the cross points in an order of the sorted intersection-connected links to form a polygon; and determining new points by shifting the cross points as the vertexes of the polygon by a predetermined distance along the side lines crossing at the respective vertexes outward with respect to the intersection node, and connecting the new points in an order of the sorted intersection-connected links to form a new polygon as the intersection shape.

13. The map display unit according to claim 10, wherein said intersection shape generation part performs the operation of:

determining cross points each between inner ones of the side lines of every pair of adjacent width-imparted intersection-connected links, and connecting the cross points in an order of the sorted intersection-connected links to form a polygon; and generating a predetermined circle including the polygon within the circle, with the intersection node as a center of the circle, as the intersection shape.

14. The map display unit according to claim 10, wherein said intersection shape generation part performs the operation of:

determining cross points each between inner ones of the side lines of every pair of adjacent width-imparted intersection-connected links, and connecting the cross points in an order of the sorted intersection-connected links to form a polygon; and generating a predetermined circle including the polygon within the circle, with the intersection node as a center of the circle, determining cross points between the circle and the side lines, and connecting the cross points in an order of the sorted intersection-connected links to form a new polygon as the intersection shape.

15. The map display unit according to claim 10, wherein, said intersection shape generation part further performs the operation of:

reading information on accessories of the intersection-connected links from the map data, and generating shapes of the accessories and determining the positions of the accessories in the intersection-connected links with reference to the intersection shape, after the generation of the intersection shape;

reading information on accessories of the intersection node from the map data, and generating shapes of the accessories and determining the positions of the accessories in the intersection shape with reference to the intersection shape, after the generation of the intersection shape; and deleting portions of the accessories extending along roads that overlap the intersection shape.

16. The map display unit according to claim 15, wherein, when the map data includes information that two of the intersection-connected links connected to the intersection are major roads, said intersection shape generation part connects center lines and lanes belonging to the two major roads smoothly, to generate a center line and lanes in the intersection shape.

17. The map display unit according to claim 10, wherein said intersection shape generation part generates an intersection shape on a route from a departure point to a destination or a stopover searched based on the map data, and further performs the operation of:

generating a vehicle path along a predetermined position on the width-imparted intersection-connected links through which the route runs; and deleting a portion of the vehicle path that overlaps the intersection shape and connecting remainders of the vehicle path in the areas other than the intersection shape separated by the deletion smoothly, to generate a vehicle path in the intersection shape.

18. The map display unit according to claim 10, wherein, when the map data includes information on a stop line of the intersection-connected link, said guidance part generates the distance from the position of the vehicle to the stop line as the distance from the position of the vehicle to a coming intersection.

19. A computer-readable medium for use with a computer, said computer readable medium containing a computer program operable to instruct the computer to perform an intersection display method for generating and displaying an intersection shape by use of map data including a road network wherein said computer program includes instructions for the computer to:

read from the map data an intersection node representing an intersection and intersection-connected links representing roads connected to the intersection node, included in the road network;

generate width-imparted intersection-connected links, for each intersection-connected link, respectively, by specifying a road width of each of the intersection-connected links, respectively, based on information associated with each of the intersection-connected links, respectively, and drawing side lines representing edges of the road on right and left sides of each of the intersection-connected links, respectively, based on the specified road width of each of the intersection-connected links, respectively;

sort the positions of the width-imparted intersection-connected links based on bearings at which the intersection-connected links are connected to the intersection node;

generate an intersection shape at the intersection node such that all cross points between the side lines of the sorted width-imparted intersection-connected links are contained within the generated intersection shape; and display the intersection shape together with other information for guidance notification.

20. The computer-readable medium according to claim 19, wherein said instruction for the computer to generate an intersection shape comprises instructions for the computer to:

determine cross points each between inner ones of the side lines of every pair of adjacent width-imparted intersection-connected links, and determine lines extending orthogonal to the intersection-connected links at positions outside the cross points with respect to the intersection node; and determine cross points between the lines and the side lines, and connect the cross points in an order of the sorted intersection-connected links to form a polygon as the intersection shape.

21. The computer-readable medium according to claim 19, wherein said instruction for the computer to generate an intersection shape comprises instructions for the computer to:

determine cross points each between inner ones of the side lines of every pair of adjacent width-imparted intersection-connected links, and connect the cross points in an order of the sorted intersection-connected links to form a polygon; and determine new points by shifting the cross points as the vertexes of the polygon by a predetermined distance along the side lines crossing at the respective vertexes outward with respect to the intersection node, and connect the new points in the order of the sorted intersection-connected links to form a new polygon as the intersection shape.

22. The computer-readable medium according to claim 19, wherein said instruction for the computer to generate an intersection shape comprises instructions for the computer to:

determine cross points each between inner ones of the side lines of every pair of adjacent width-imparted intersection-connected links, and connect the cross points in an order of the sorted intersection-connected links to form a polygon; and generate a predetermined circle including the polygon within the circle with the intersection node as a center of the circle, as the intersection shape.

23. The computer-readable medium according to claim 19, wherein said instruction for the computer to generate an intersection shape comprises instruction for the computer to:

determine cross points each between inner ones of the side lines of every pair of adjacent width-imparted intersection-connected links, and connect the cross points in an order of the sorted intersection-connected links to form a polygon; and generate a predetermined circle including the polygon within the circle with the intersection node as a center of the circle, determine cross points between the circle and the side lines, and connect the cross points in the order of the sorted intersection-connected links to form a new polygon as the intersection shape.

24. The computer-readable medium according to claim 19, wherein said computer program further comprises instructions for the computer to, after generating the intersection shape:

process the intersection-connected links, including reading information on accessories of the intersection-connected links from the map data, and generating shapes of the accessories and determining the positions of the accessories in the intersection-connected links with reference to the intersection shape; and process the intersection, including reading information on accessories of the intersection node from the map data, and generating shapes of the accessories and determining the positions of the accessories in the intersection shape with reference to the intersection shape, wherein said instruction to process the intersection-connected links includes an instruction for the computer to delete portions of the accessories extending along roads that overlap the intersection shape.

25. The computer-readable medium according to claim 24, wherein said instruction to process the intersection includes an instruction for the computer to, when the map data includes information that two of the intersection-connected links connected to the intersection are major roads, connect center lines and lanes belonging to the two major roads smoothly, to generate a center line and lanes in the intersection shape.

26. The computer-readable medium according to claim 19, wherein said instruction to generate an intersection shape relates to generation of an intersection shape on a route from a departure point to a destination or a stopover searched based on the map data, and further comprises instructions for the computer to:

generate a vehicle path along a predetermined position on the width-imparted intersection-connected links through which the route runs; and delete a portion of the vehicle path that overlaps the intersection shape and connecting remainders of the vehicle path in the areas other than the intersection shape separated by the deletion smoothly, to generate a vehicle path in the intersection shape.

27. The computer-readable medium according to claim 19, wherein said instruction to display the intersection shape includes an instruction for the computer to, when the map data includes information on a stop line of the intersection-connected link, generate the distance from the position of a vehicle to the stop line as the distance from the position of the vehicle to a coming intersection, in the generation of notification information for guidance of the vehicle based on the map data, the intersection shape, and the route from a departure point to a destination or a stopover searched based on the map data.

28. A data recording medium containing recorded computer-readable data, the data comprising:

data on an intersection node representing an intersection included in a road network;

data on intersection-connected links representing roads connected to the intersection node; and data on an intersection shape corresponding to the intersection node, generated by: generated width-imparted intersection-connected links for each intersection-connected link, respectively, by specifying a road width of each of the intersection-connected links, respectively, based on information associated with each of the intersection-connected links, respectively, and drawing side lines representing edges of the road on right and left sides of each of the intersection-connected links, respectively, based on the specified road width of each of the intersection-connected links, respectively; and sorting positions of the intersection-connected links based on bearings at which the intersection-connected links are connected to the intersection node, such that all cross points between the side lines of the sorted width-imparted intersection-connected links are contained within the generated intersection shape.

29. The data recording medium according to claim 28, wherein the intersection shape is a polygon formed by:

determining cross points between inner ones of the side lines for every pair of adjacent width-imparted intersection-connected links, and determining lines extending orthogonal to the intersection-connected links at positions outside the cross points with respect to the intersection node; and determining cross points between the lines and the side lines, and connecting the cross points in an order of the sorted intersection-connected links.

30. The data recording medium according to claim 28, wherein the intersection shape is a polygon formed by:

determining cross points each between inner ones of the side lines of every pair of adjacent width-imparted intersection-connected links, and connecting the cross points in an order of the sorted intersection-connected links to form a provisional polygon; and determining new points by shifting the cross points as the vertexes of the provisional polygon by a predetermined distance along the side lines crossing at the respective vertexes outward with respect to the intersection node, and connecting the new points in the order of the sorted intersection-connected links.

31. The data recording medium according to claim 28, wherein the intersection shape is a predetermined circle formed by:

determining cross points each between inner ones of the side lines of every pair of adjacent width-imparted intersection-connected links, and connecting the cross points in an order of the sorted intersection-connected links; and generating the predetermined circle including the polygon within the circle with the intersection node as a center of the circle.

32. The data recording medium according to claim 28, wherein the intersection shape is a polygon formed by:

determining cross points each between inner ones of the side lines of every pair of adjacent width-imparted intersection-connected links, and connecting the cross points in an order of the sorted intersection-connected links to form a provisional polygon; and generating a predetermined circle including the provisional polygon within the circle with the intersection node as a center of the circle, determining cross points between the circle and the side lines, and connecting the cross points in the order of the sorted intersection-connected links.

* * * * *